United States Patent
Groves

(10) Patent No.: US 7,458,724 B2
(45) Date of Patent: Dec. 2, 2008

(54) PRESSURE BIASED LUBRICANT VALVE

(75) Inventor: Christopher J. Groves, Domevre sur Durbion (FR)

(73) Assignee: Honeywell International, Inc., Morristown, NJ (US)

(*) Notice: Subject to any disclaimer, the term of this patent is extended or adjusted under 35 U.S.C. 154(b) by 346 days.

(21) Appl. No.: 11/280,135

(22) Filed: Nov. 15, 2005

(65) Prior Publication Data

US 2007/0110349 A1 May 17, 2007

(51) Int. Cl.
*F16C 17/04* (2006.01)
*F04B 17/00* (2006.01)
(52) U.S. Cl. .................. 384/121; 384/369; 417/407
(58) Field of Classification Search ............. 384/107, 384/121, 248, 368, 369, 420; 417/417, 407
See application file for complete search history.

(56) References Cited

U.S. PATENT DOCUMENTS 4,453,837 A * 6/1984 Shimizu et al. ............. 384/121
5,042,616 A * 8/1991 McHugh .................... 384/121
5,178,471 A * 1/1993 Roessler et al. ............ 384/369
6,669,372 B1 * 12/2003 Martin ...................... 384/303

FOREIGN PATENT DOCUMENTS

JP 02190611 A * 7/1990

OTHER PUBLICATIONS

PCT ISR/WO Honeywell, Inc.

* cited by examiner

*Primary Examiner*—Thomas R Hannon
(74) *Attorney, Agent, or Firm*—Lee & Hayes LLP

(57) ABSTRACT

An exemplary center housing for a turbocharger includes a bore for supporting a turbocharger shaft, a lubricant feed port, a first lubricant outlet port, a second lubricant outlet port and a valve operably disposed to provide a first path from the lubricant feed port to the first lubricant outlet port and a second path from the lubricant feed port to the second lubricant outlet port wherein the valve responds to pressure generated by axial movement of the turbocharger shaft to increase resistance of the first path or the second path. Various other exemplary mechanisms are also disclosed.

14 Claims, 7 Drawing Sheets

TURBOCHARGER SYSTEM
200

PRESSURE BIASED LUBRICANT VALVE

TECHNICAL FIELD

Subject matter disclosed herein relates generally to turbochargers for internal combustion engines and, in particular, mechanisms for absorbing thrust forces carried by a turbocharger shaft.

BACKGROUND

A turbocharger experiences various forces during operation. Such forces are transmitted to various components and can result in power losses and wear. At steady state and transient operating conditions the fluid (gas) forces at the compressor and turbine wheels create a net axial load in the turbocharger shaft. The magnitude and direction of this axial load varies depending upon the operating conditions. Various exemplary mechanisms presented herein address such thrust force issues. Other goals and achievements are also discussed herein.

SUMMARY

An exemplary center housing for a turbocharger includes a bore for supporting a turbocharger shaft, a lubricant feed port, a first lubricant outlet port, a second lubricant outlet port and a valve operably disposed to provide a first path from the lubricant feed port to the first lubricant outlet port and a second path from the lubricant feed port to the second lubricant outlet port wherein the valve responds to pressure generated by axial movement of the turbocharger shaft to increase resistance of the first path or the second path. Various other exemplary mechanisms are also disclosed.

BRIEF DESCRIPTION OF THE DRAWINGS

A more complete understanding of the various method, systems and/or arrangements described herein, and equivalents thereof, may be had by reference to the following detailed description when taken in conjunction with the accompanying drawings wherein.

DETAILED DESCRIPTION

Figure 1:
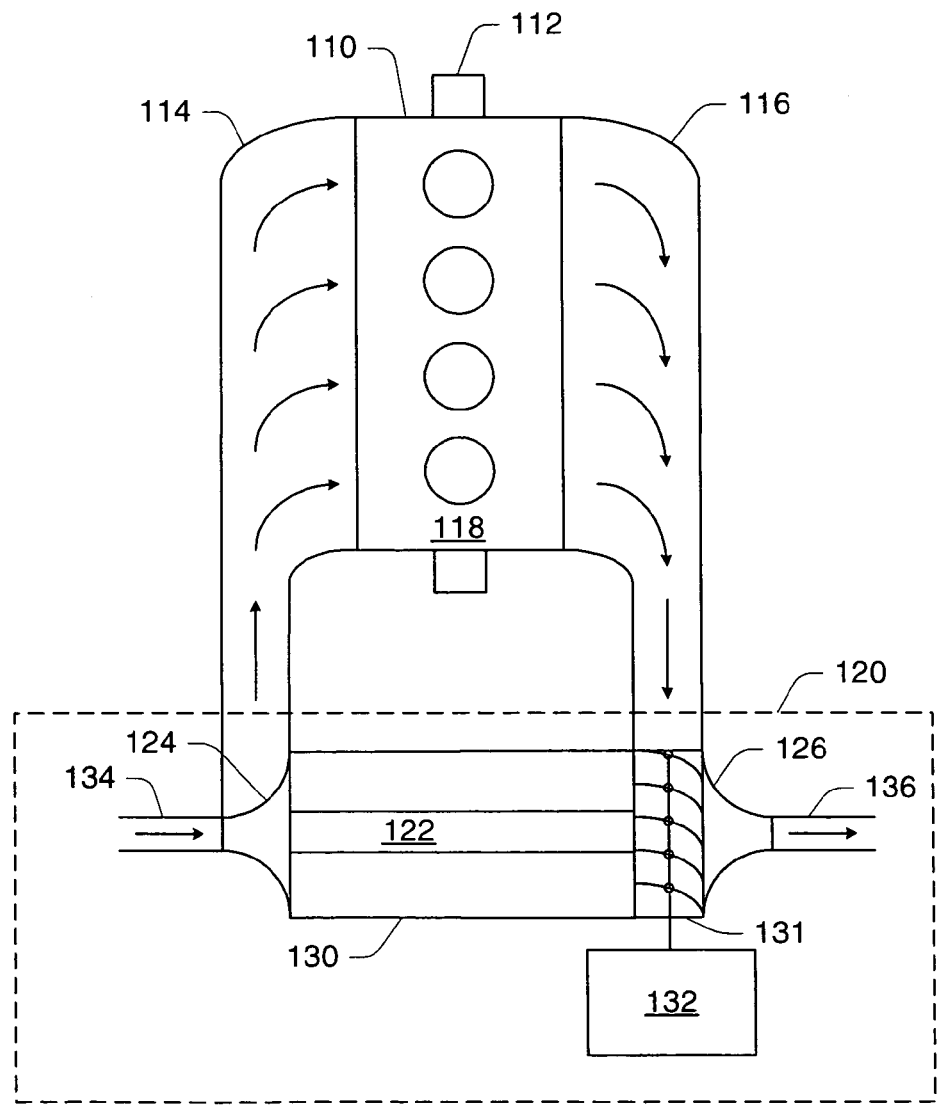
FIG. 1 is a simplified approximate diagram illustrating a prior art turbocharger system.

Turbochargers are frequently utilized to increase the power output of an internal combustion engine. Referring to FIG. 1, a prior art power system 100 includes an internal combustion engine 110 and a turbocharger 120. The internal combustion engine 110 includes an engine block 118 housing one or more combustion chambers that operatively drive a shaft 112. An intake port 114 provides a flow path for compressed intake air to the engine block while an exhaust port 116 provides a flow path for exhaust from the engine block 118. The turbocharger 120 acts to extract energy from the exhaust and to provide energy to the intake air.

As shown in FIG. 1, the turbocharger 120 includes an air inlet 134, a shaft 122, a compressor stage 124, a turbine stage 126, a center housing 130 and an exhaust outlet 136. An optional variable geometry unit 131 and a variable geometry controller 132 are also shown, which may use multiple adjustable vanes, a wastegate or other features to control the flow of exhaust.

In general, the turbine stage 126 includes a turbine wheel housed in a turbine housing and the compressor stage 124 includes a compressor wheel housed in a compressor housing where the turbine housing and compressor housing connect directly or indirectly to the center housing 130. The center housing 130 typically houses one or more bearings that rotatably support the shaft 122, which is optionally a multi-component shaft. Often, the center housing 130 provides a means for lubricating various turbocharger components. For example, the center housing 130 typically defines a passage or passages for circulating lubricant (e.g., oil) to and from the shaft bearing(s). Lubricant can also function as a coolant to convect thermal energy away from various components.

Various exemplary mechanisms discussed herein pertain to lubrication of components for absorbing turbocharger thrust forces. As described in more detail below, thrust forces cause slight axial movement of the shaft 122, which, in turn, can reduce space between the adjacent components and hinder or prevent circulation of lubricant. While thrust forces inherently lead to losses, various exemplary mechanisms distribute lubricant to limit consequences of such losses.

Figure 2:
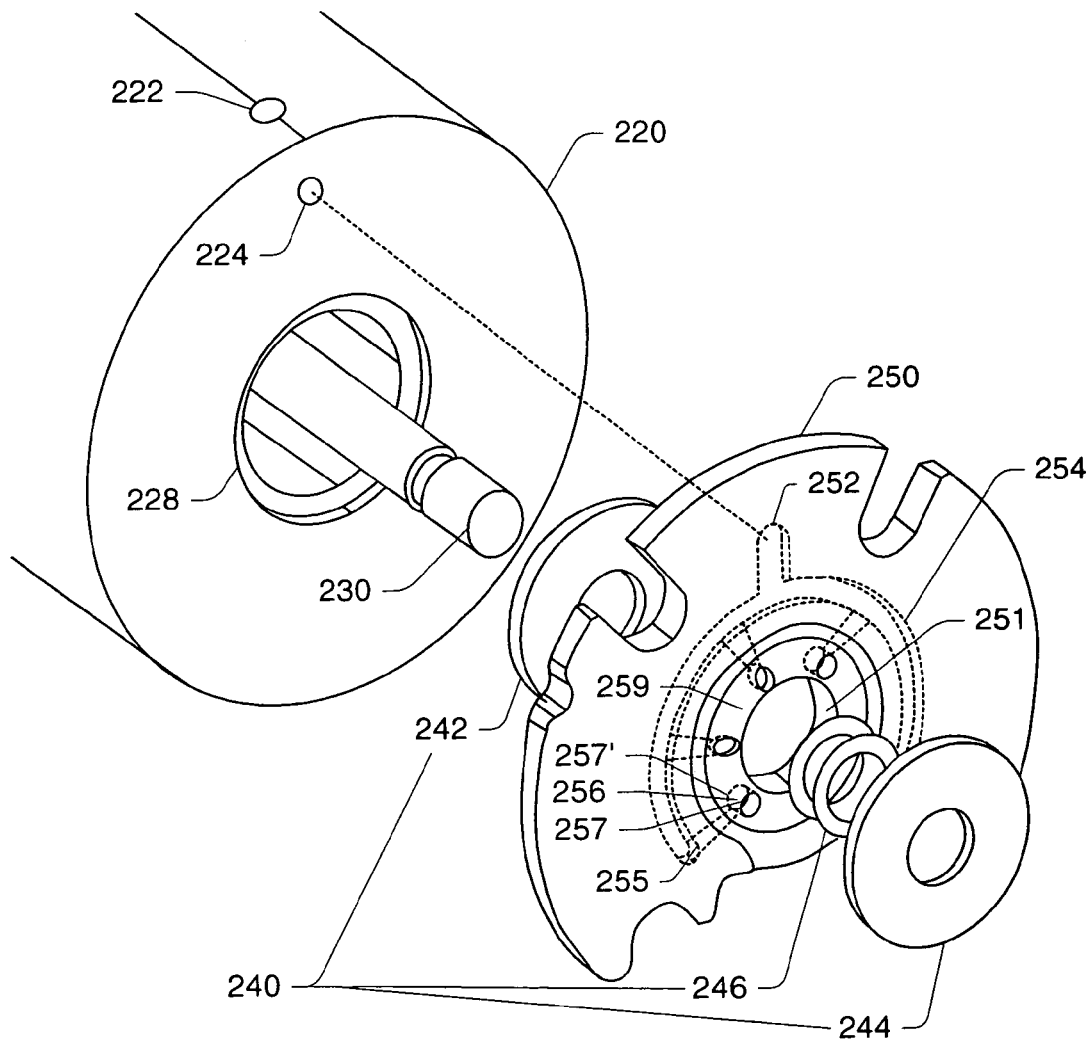
FIG. 2 is an exploded perspective view illustrating a prior art center housing, a thrust bearing that includes a thrust plate and a thrust collar.

FIG. 2 shows a prior art turbocharger assembly 200. The exploded view of the assembly 200 illustrates a mechanism to absorb thrust forces. The assembly 200 includes a center housing 220, a shaft 230, a thrust plate 250 and a three-piece thrust collar 240 (items 242, 244, 246). The center housing 220 includes a lubricant feed 222 and a compressor end lubricant port 224. A bore 228 receives the shaft 230, which is supported by one or more bearings typically housed in the bore 228 (not shown). The thrust bearing includes a thrust plate 250 and thrust collar 240 that are sized to provide adequate load bearing capacity without excessive losses. In this example, the plate 250 includes a centrally located bore 251 that cooperates with the thrust collar 240 (e.g., to receive the component 246). While some naming conventions refer to a thrust plate as a thrust bearing, in either instance, such a component typically cooperates with one or more thrust washers or a thrust collar (e.g., consider component discs 242 and 244 and axial spacer 246 of the thrust collar 240). A thrust collar may be a single component or a multi-component assembly. During operation of a turbocharger, the thrust collar 240 (e.g., or thrust washer(s)) rotate with respect to the thrust plate 250 and can translate axially to some limited extent (e.g., typically limited by gaps defined by the thrust bearing assembly).

The thrust bearing plate 250 includes a lubricant feed 252 that aligns With the lubricant port 224 of the housing 220. A number of different techniques and arrangements exist to transfer lubricant from the lubricant feed 252 to thrust bearing pads 259 of the thrust bearing plate 250. FIG. 2 demonstrates a technique whereby the lubricant feed 252 is contiguous with a channel 254 (open to the housing side of the plate 250 ). The channel 254 distributes lubricant via six radial paths 255 to six substantially axial paths 256 where each of the six axial paths 256 extends between a compressor side orifice 257 and a housing side orifice 257' of the plate 250. The six compressor side orifices 257 are distributed to lubricate compressor side. thrust plate pads 259 distributed about 360°, thus, such a plate is referred to as a 360° plate as opposed to other prior art plates that do not have pads that completely surround the bearing portion 246 of the thrust collar 240 (e.g., a 270° plate). The housing side of the thrust plate 250 includes similar pads arranged with respect to the six orifices 257'. Functioning of the thrust plate 250 and the thrust collar 240 are further described with respect to FIG. 3.

Figure 3:
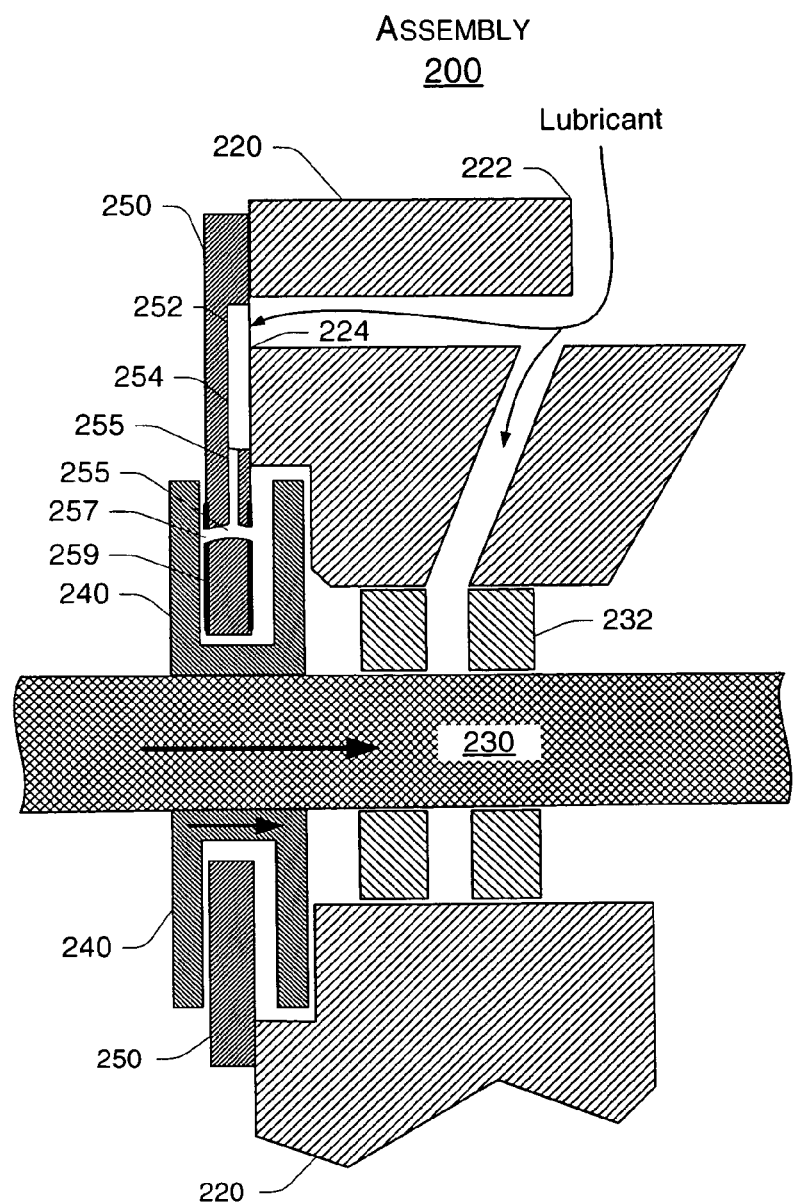
FIG. 3 is a simplified approximate cross-sectional view illustrating a prior art center housing, a thrust plate and a thrust collar.

FIG. 3 shows an approximate cross-sectional view of the prior art assembly 200 of FIG. 2. The thrust plate 250 is fixed to the center housing 220 and the thrust collar 240 is fixed to the shaft 230. During operation, the shaft 230 experiences thrust forces that move the shaft 230 axially, typically a small amount defined by clearances, tolerances and dictated by the reactive forces generated by the thrust bearing assembly which can oppose the imposed thrust forces. In the example of FIG. 3, the shaft 230 moves to the right (e.g., toward the exhaust turbine end of a turbocharger) and the thrust collar 240 and thrust plate 250 mechanism reacts to the imposed axial load.

As mentioned with respect to FIG. 2, lubricant enters the thrust plate 250 via the lubricant feed 252 flows into the channel 254, distributes into a plurality of radial paths 255 where each radial path 255 feeds a substantially axial path 256 that feeds a pair of orifices (e.g., the orifice 257). On each side of the plate 250, an orifice (e.g., the orifice 257) provides lubricant to one or more pads (e.g., the pad 259). Again, in this example, each axial path 256 extends from the compressor side to the center housing side of the plate 250. Other arrangements may have separate radial paths or orifices for the compressor side and the center housing side of the plate.

The lubricant distribution network creates lubricant layers in gaps between the thrust plate 250 and the thrust collar 240. In particular, a compressor side layer exists in an annular compressor side gap between the thrust plate 250 (e.g., in a region including the pads) and the thrust collar 240 (e.g., interior surface of the collar) and a center housing side layer exists in an annular center housing-side gap between the thrust plate 250 (e.g., in the region including the pads) and the thrust collar 240 (e.g., interior surface of the collar). These two lubricant layers act to absorb loads caused by axial movement of the shaft 230. In addition to axial movement, the shaft 230 causes rotation of the thrust collar 240. Thus, lubricant in the plate/collar gaps undergoes rotational shear as well as experiencing axial loads.

When the shaft 230 translates axially, one of the layers experiences an increased load. For example, as the shaft 230 translates axially away from the compressor (i.e., toward the turbine), the center housing side layer axial load increases while the compressor side layer axial load decreases or is "unloaded". As the shaft 230 translates, the lubricant layer with an increased load thins since the reactive bearing force has an inverse relationship to the thickness of the lubricant layer and, under dynamic loading conditions, as the substantially incompressible lubricant is squeezed out with increasing load pressure. Essentially, as the applied axial load increases, on the loaded side, the lubricant film thickness and lubricant flow rate decrease while the gap pressure increases. In turn, the opposing layer becomes thicker (e.g., increased gap between collar 240 and plate 250), which may be accompanied by an associated decrease in pressure.

For the assembly 200, two factors act to increase lubricant pressure on the loaded side: (i) reaction to the axial thrust force and (ii) increased resistance to flow due to spatial considerations (i.e., a smaller gap). Of course, these are interrelated. Consider that the lubricant film thickness on the loaded side of the thrust bearing decreases with increasing load and becomes smaller than the film thickness on the unloaded side. The decrease in film thickness is due to decreased gap between the plate 250 and the collar 240 on the loaded side. This decrease in gap width increases the resistance of the lubricant path to the loaded side of the thrust bearing, which also hinders draining of lubricant from the loaded side. As a consequence, given a certain feed pressure, less lubricant will flow to the loaded side and/or the pressure on the loaded side will increase due to increased resistance to flow (e.g., path of least resistance). Given such a scenario, lubricant flow to the unloaded side can be expected to increase and thereby increase lubricant-related losses on the unloaded side. If the unloaded side had no lubricant, then there would be effectively no lubricant related losses on the unloaded side.

Excessive loading, especially unbalanced loading, can decrease the load absorbing effectiveness of this conventional thrust collar and thrust plate mechanism. More specifically, a viscous shear-torque effect decreases efficiency due to shearing action of the lubricant in the thrust bearing assembly and viscosity of the lubricant. For this mechanism, the total shear-torque is a sum of the torque from the lubricant shear on the loaded or active side and the unloaded side. An increase in pressure can increase lubricant viscosity (e.g., Barus's law); thus, the loaded side layer shear-torque losses can increase with increasing pressure. However, in general, lubricant pressures developed in a turbocharger thrust bearing assembly are relatively small and hence any viscosity increase due to pressure tends to be small. Further, lubricant heating can be altered by axial loading in combination with shear. For example, when axial loading occurs together with shear, one lubricant layer may heat more rapidly than the other lubricant layer thereby causing a temperature differential that can increase stresses and wear. In general, viscosity decreases with temperature, hence, this effect may to some extent decrease losses on the loaded side.

In general, for a lubricant between parallel plates (radius R) where one plate rotates and the other plate is stationary, torque may be approximated as follows:

$$T = 2\pi \int_0^R \eta \gamma r^2 dr \quad (1)$$

where η is the viscosity and y is shear, noting, assuming a constant speed of rotation, that shear stress increases with decreasing plate radius R and that shear rate increases with decreasing spacing between the plates. For turbochargers, the radii of the thrust collar 240 and the thrust plate 250 are fixed; however, as already mentioned, gap width changes due to axial movement of the shaft 230. Consequently, axial movement of the shaft 230 and, hence, movement of the thrust collar 240 with respect to the thrust plate 250 alters shear rate for lubricant on both sides of the thrust plate 250. In sum, the higher the axial load the smaller the gap becomes on the loaded side as the lubricant film pressure force to react the axial load varies as an inverse function of the lubricant-film thickness.

For the assembly 200, losses are greatest on the loaded side. However, as already mentioned, losses also exist on the unloaded side. As described herein, an exemplary mechanism acts to reduce losses on the unloaded side. For example, an exemplary mechanism reduces or ceases lubricant flow to the unloaded side to thereby reduce the amount of lubricant or lubricant gas mix on the unloaded side and, in turn, reduce lubricant shear losses on the unloaded side. Such an exemplary mechanism can also act to diminish the small parasitic axial load of the unloaded side acting against the loaded side force so that the loaded side lubricant film thickness (e.g., the gap width) increases slightly.

As described herein an exemplary thrust mechanism distributes shaft thrust loads more symmetrically via hydrodynamics. In particular, an exemplary lubricant pressure-driven mechanism actuates or "balances" a lubricant flow valve. In this example, lubricant pathways allow for lubricant flow to an exemplary thrust collar and thrust plate assembly and allow for communication of lubricant pressure from the assembly to actuate the lubricant flow valve.

The exemplary mechanism acts to reduce power loss due to lubricant shear torque by primarily reducing the shear torque losses on the unloaded side. An exemplary lubricant flow valve is in some examples referred to herein as a pressure bias valve.

Figure 4:
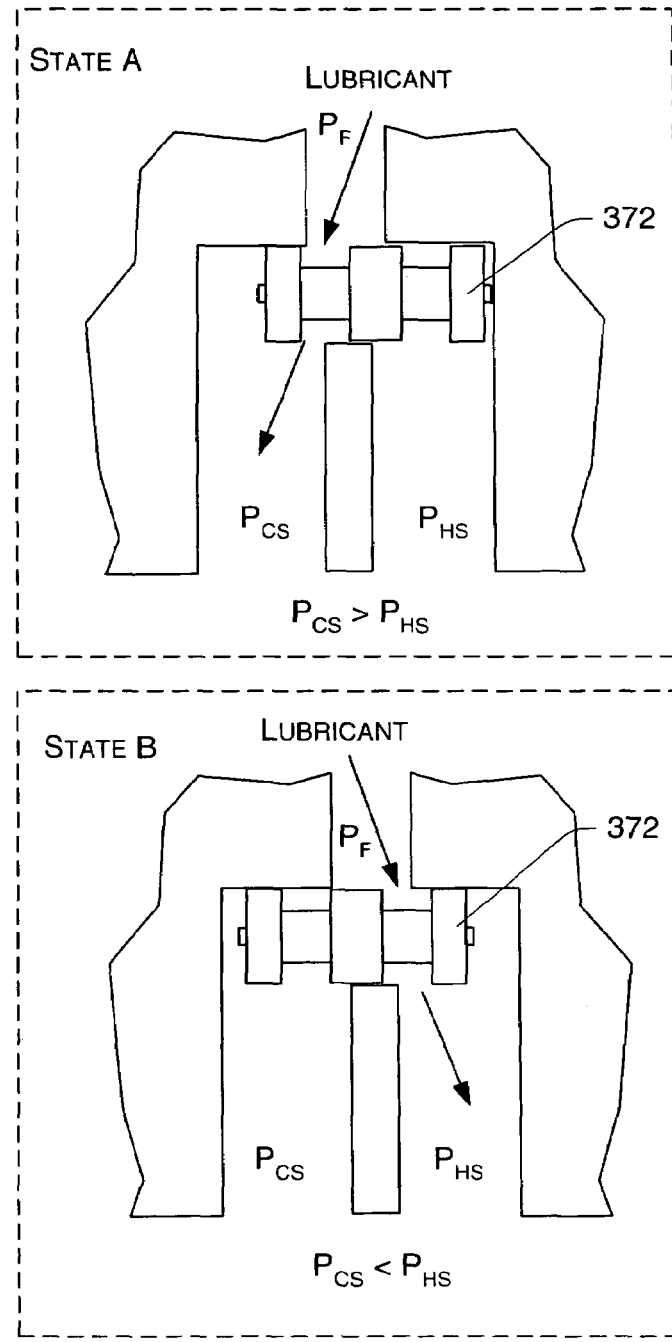
FIG. 4 is a diagram of an exemplary valve that includes a spool and two associated operational states.

FIG. 4 shows an exemplary valve 370 in two different operational states: State A and State B. The valve 370 includes a spool 372 that resides in a spool bore in which the spool 372 can translate in response to changes in pressure and thereby alter flow of lubricant. The spool 372 connects with three paths: a feed path at pressure $P_F$, a compressor side path at pressure $P_{CS}$ and a housing side path at pressure $P_{HS}$. The pressures in these paths determine spool position and, hence, how lubricant flows through the valve 370. More particularly, the pressures cause the valve 370 to adjust resistance of the paths, which, in turn, affects lubricant flow.

As already explained above, under an axial load, the lubricant film thickness on the loaded side of the thrust bearing decreases and becomes smaller than the thickness on the unloaded side and increases resistance to flow. As a consequence, given a certain feed pressure, less lubricant will flow to the loaded side and/or the pressure on the loaded side will increase due to increased resistance to flow. The exemplary valve 370 counteracts this phenomenon by increasing the resistance of the unloaded side path. Further, such valve action can decrease the resistance of the loaded side path. Thus, the exemplary valve 370 can alter the balance of flow between the loaded and unloaded sides. Importantly, increased resistance of the unloaded side path acts to decrease flow to the unloaded side. Without such a mechanism, lubricant flow to the unloaded side could actually increase and thereby increase power loss.

With respect to State A, the compressor side is the loaded side (high pressure) whereas in State B, the housing side is the loaded side (high pressure). In State A, $P_{CS}$ exceeds $P_{HS}$, which causes the spool 372 to translate towards the right and thereby at least partially restrict the path between the feed and housing side paths. In State A, where $P_F$ exceeds $P_{CS}$, lubricant is expected to flow predominantly to the compressor side path.

In State B, $P_{HS}$ exceeds $P_{CS}$, which causes the spool 372 to translate towards the left and thereby at least partially restrict the path between the feed and compressor side paths. In State B, where $P_F$ exceeds $P_{HS}$, lubricant is expected to flow predominantly to the housing side path.

The valve 370 may be referred to as a bias valve as differential pressures act to bias the spool 372. In various examples, the housing or the spool optionally include a bypass that allows a minimum amount of lubricant to flow, where appropriate, to the unloaded side. Such a bypass can also facilitate movement of the spool if the axial load direction changes. For example, a small amount of lubricant flow to the unloaded side may ensure a minimum amount of pressure such that pressure swings are not too extreme or to ensure that the spool does not become wedged (e.g., excessively biased).

The spool 372 may be constructed of metal or other suitable material and fitted into a cavity (e.g., a machined bore) within a center housing. Thrust plates suitable for use with the exemplary valve mechanism 370 are discussed below. The valve mechanism may also act to reduce total lubricant flow to the thrust bearing and hence reduced occurrence of issues associated with lubricant seals of a center housing.

Various factors can address transients. For example, where the frequency of transients is high (e.g., race car applications, etc.), spool mass and size may be adjusted downward to ensure adequate dynamics. In instances where fewer transients (e.g., a steady running engine) are expected, a larger or higher mass spool may be used. Of course, various arrangements are possible depending on operational requirements. In general, turbocharger size increases with engine size and often larger engines (e.g., semi-tractors, ships, trains, etc.) are operated substantially in steady state. Larger turbochargers typically have larger center housings and therefore can more readily and economically accommodate valve components such as a valve spool.

Figure 5:
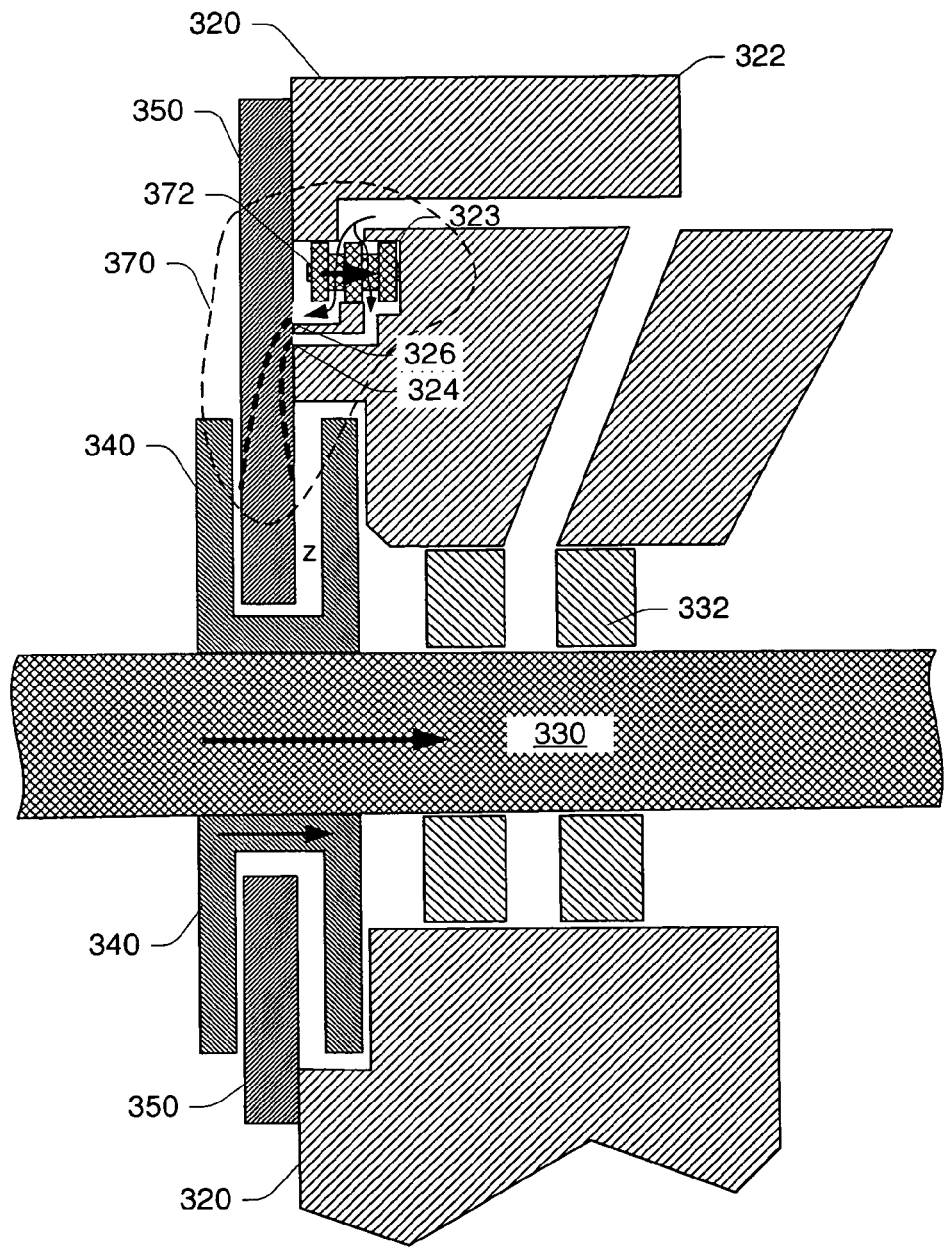
FIG. 5 is a simplified approximate cross-sectional view illustrating an exemplary valve and associated components including a center housing, a thrust plate and a thrust collar.

FIG. 5 shows an exemplary assembly 300 that uses a mechanism such as that described with respect to the exemplary valve 370 of FIG. 4. A dashed line labeled 370 indicates an exemplary valve and associated portions of the assembly 300 that directly affect lubricant dynamics. Various other components are essentially the same as in the assembly 200 of FIG. 2. For example, the exemplary assembly 300 includes a shaft 330, a bearing 332 and a thrust collar 340 which are essentially the same as the shaft 230, the bearing 232 and the thrust collar 240 of the assembly 200 of FIG. 2. However, the exemplary assembly 300 includes a housing 320 and a plate 350 that differ from those of the prior art assembly 200. In particular, these components cooperate with the exemplary valve 370.

Figure 6:
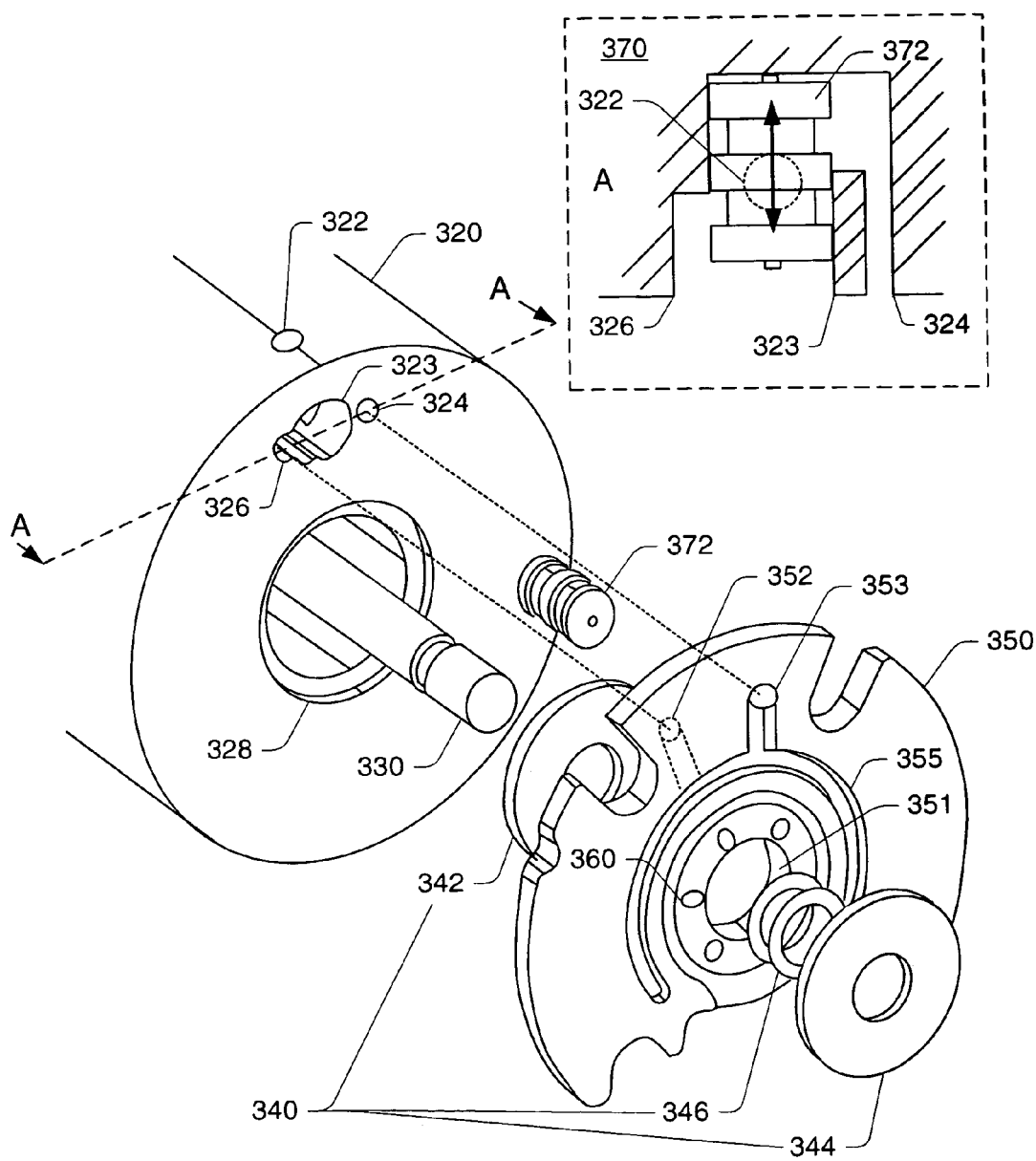
FIG. 6 is an exploded perspective view illustrating an exemplary valve and associated components and a corresponding cross-sectional view illustrating the valve.
Figure 7:
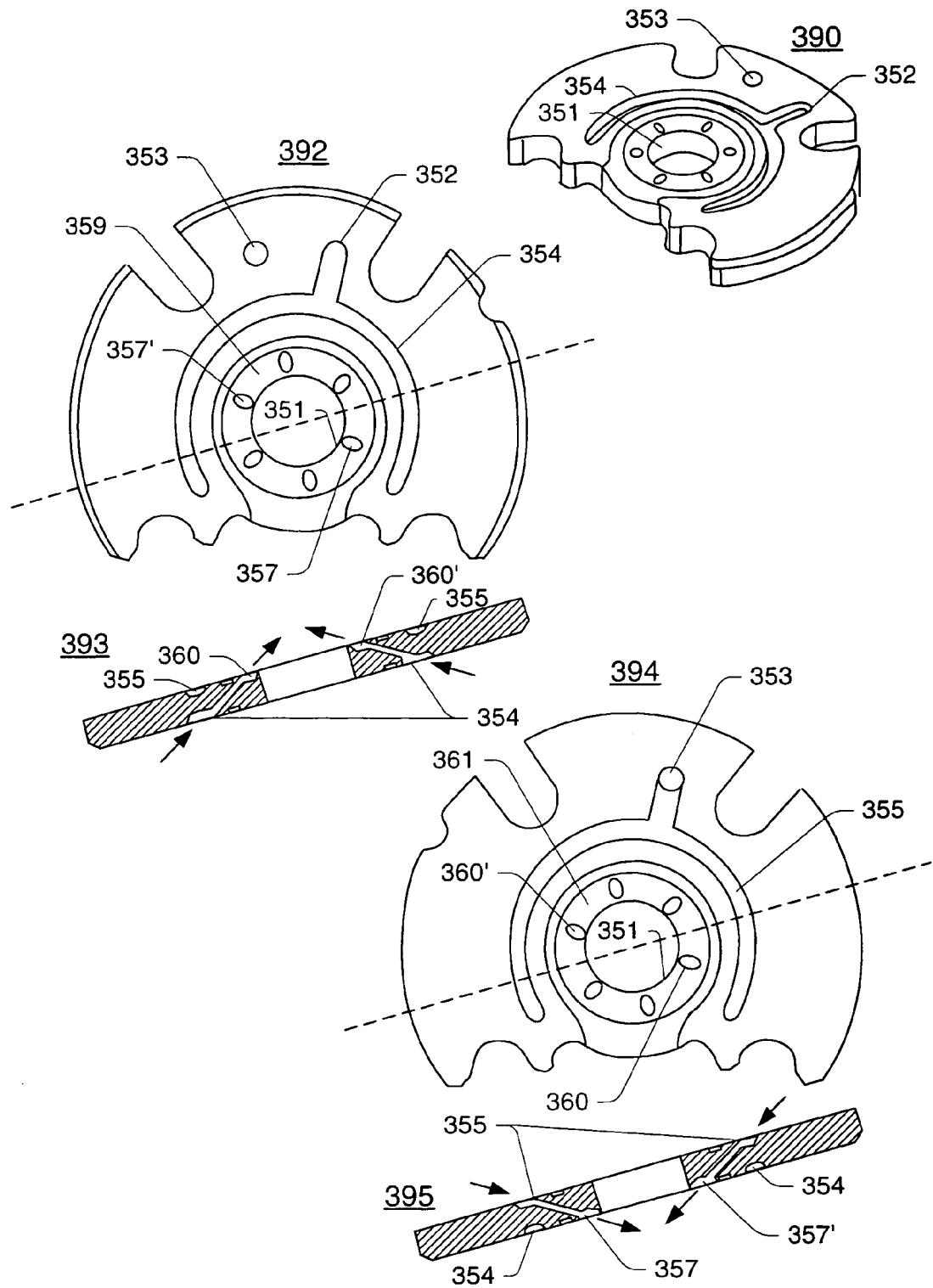
FIG. 7 is a series of views illustrating an exemplary thrust plate.

The exemplary valve 370 includes a spool 372 that resides in a bore 323 of the housing 320. The housing 320 includes a lubricant port 322 for feeding lubricant to the valve 370 and optionally one or more other regions of the assembly 300. The housing 320 also includes a center housing side lubricant port 324 and a compressor side lubricant port 326 that cooperate with the plate 350 to provide lubricant paths (thick dashed lines) to the center housing side lubricant gap and the compressor side lubricant gap of the plate 350, respectively. The thick dashed lines representing the paths are for purposes of illustration only as the actual paths may differ (see, e.g., the thrust plate 350 of FIG. 7). Further, orifice locations and pads are not shown in FIG. 5. Some non-limiting examples of pad and orifice locations are shown in FIGS. 6 and 7. However, FIG. 5 does show an axial dimension "z", which represents an axial distance between the plate 350 and a surface of the thrust collar 340. Another such axial dimension exists on the compressor side of the assembly 300 as well. These axial dimensions (e.g., $Z_{HS}$ for "housing side" and $Z_{CS}$ for "compressor side") represent or approximate lubricant gap widths.

The plate 350 allows communication of pressure from the housing side plate/thrust collar gap (e.g., $P_{HS}$) to the housing side port 324 and allows communication of pressure from the compressor side plate/thrust collar gap (e.g., $P_{CS}$) to the compressor side port 326. Changes in these pressures can affect position of the spool 372 in the bore 323 and thereby alter resistance of lubricant flow paths to the plate 350. Again, lubricant will flow from high to low pressure; thus, where the pressure to the lubricant feed exceeds that of one of the paths, then lubricant will flow to that path. Where the lubricant feed pressure exceeds that of both paths, and both paths are at least partially open, lubricant will flow to both paths.

With respect to the arrangement of FIG. 5, if the pressure on the compressor side (e.g., loaded side) exceeds the pressure on the housing side (e.g., unloaded side), the spool 372 moves to the right and this movement acts to reduce the resistance of the lubricant path to the compressor side (e.g., loaded side). However, the spool 372 does not increase the resistance of the housing side path such that no lubricant can flow to the housing side (e.g., unloaded side). As shown, the spool 372 increases resistance yet still provides a path for lubricant flow to the housing side (the unloaded side). Such a mechanism can allow for appropriate dynamics and ensure that at least some lubrication of the unloaded side occurs.

FIG. 6 shows an exemplary assembly 300 that includes a center housing 320, a shaft 330, a thrust collar 340, a plate 350 and a pressure-driven valve 370. In this example, the plate 350 includes a centrally located bore 351 that cooperates with the thrust collar 340 (e.g., to receive the component 346). A thrust plate bore may be a complete bore or a partial bore (e.g., open along an arc section). The housing 320 includes a center bore 328 for receiving the shaft 330 and a spool bore 323 for receiving a spool 372 of the valve 370. The valve 370 controls lubricant flow paths between the feed port 322 and a center housing side port 324 and between the feed port 322 and a compressor side port 326. The center housing side port 324 and the compressor side port 326 are in communication with corresponding ports of the plate 350.

The plate 350 is a cross-flow plate where a port 352 located on the center housing side of the plate 350 links to a channel (not shown) that links to a plurality of orifices 360 on the compressor side of the plate 350 and where a port 353 also located on the center housing side of the plate 350 links to a channel 355 that links to a plurality of orifices (not shown) on the center housing side of the plate 350.

Thus, pressure ($P_{HS}$) in the gap between the plate 350 and the annular body 342 of the thrust collar 340 is communicated to the center housing side port 324 of the housing 320 and pressure ($P_{CS}$) in the gap between the plate 350 and the annular body 344 of the thrust collar 340 is communicated to the compressor side port 326 of the housing 320. An approximate cross-section "A" of the housing 320 shows the valve 370. A double-headed arrow on the spool 372 indicates axial motion of the spool 372, responsive to pressure change, to thereby alter lubricant paths to the plate/thrust collar gaps.

FIG. 7 shows various views of an exemplary plate 350 including a perspective view 390, a center housing side plan view 392, a compressor side plan view 394, a cross-sectional view through two compressor side orifices 393 and a cross-section through two center housing side orifices 395.

The view 390 shows the center housing side of the plate 350, which includes the lubricant ports 352, 353 and a central bore 351. The port 352 links to the channel 354 (see also views 392, 393, 395), which links to compressor side orifices (see orifices 360, 360' of views 393, 394). The port 353 links to a channel (see channel 355 of views 393, 394, 395), which links to center housing side orifices (see orifices 357, 357' of views 392, 395).

The view 392 shows the plate 350 as having a substantially circular shape where cut-outs exist, as appropriate, for cooperation or cooperative fit with other turbocharger components. A lubricant port 352 is positioned at about 75° and links to the channel 354, which has an annular shape extending from about −35° to about 215°. Six orifices 357, 357', etc., are arranged around a central bore 351 at about 60° intervals. These six orifices link, via the channel 355, to the port 353, which is positioned at about 105°. A plurality of pads 359 exist on a center housing side surface of the plate 350 adjacent to the orifices 357, 357'. Other arrangements are possible as well for such pads and orifices for proper lubrication.

The view 393 is a cross-section of the plate 350 that shows passages between the channel 354 and the orifices 360, 360'. Arrows indicate a direction of lubricant flow from the channel 354 to the orifices 360, 360'. The compressor side channel 355 is also shown; however, the cross-section does not pass through any of the center housing side orifices (see, e.g., the orifices 357, 357', etc.).

The view 394 shows the plate 350 including the lubricant port 353 positioned at about 75° and links to the channel 355, which has an annular shape extending from about −35° to about 215°. Six orifices 360, 360', etc., are arranged around a central bore 351 at about 60° intervals. These six orifices link, via the channel 354, to the port 352, which is positioned at about 105° on the opposite side of the plate 350. A plurality of pads 361 exist on a compressor side surface of the plate 350 adjacent to the orifices 360, 360'. Other arrangements are possible as well for such pads and orifices for proper lubrication.

As described herein an exemplary center housing (e.g., 320) for a turbocharger may include a bore (e.g., 328) for supporting a turbocharger shaft (e.g., 330), a lubricant feed port (e.g., 322), a first lubricant outlet port (e.g., 324), a second lubricant outlet port (e.g., 326) and a valve (e.g., 370) operably disposed to provide a first path from the lubricant feed port to the first lubricant outlet port and a second path from the lubricant feed port to the second lubricant outlet port wherein the valve responds to pressure generated by axial movement of the turbocharger shaft to increase resistance of the first path or the second path. Such a valve optionally includes a spool (e.g., 322).

An exemplary assembly may include a center housing (e.g., 320) and an exemplary thrust plate (e.g., 350) that includes a first port (e.g., 353) to receive lubricant from the first lubricant outlet port (e.g., 324) of the housing and a second port (e.g., 352) to receive lubricant from the second lubricant outlet port (e.g., 326) of the housing. In such an example, the first port of the thrust plate may provide lubricant to a compressor side of the thrust plate and the second port of the thrust plate may provide lubricant to a housing side of the plate. Further, in such an example, the first port and the second port may communicate pressure generated by axial movement of the turbocharger shaft to the first outlet port of the housing and the second outlet port of the housing, respectively.

As described herein an exemplary thrust plate may be substantially disc-shaped, for example, consider the plate 350 of FIG. 6 and FIG. 7. Other shapes are possible and may depend on the nature of the compressor end of a center housing or other factors. However, such other shapes may include features of the plate 350 to provide for lubrication of a thrust collar or thrust washer(s). An exemplary thrust plate (e.g., 350) typically includes a centrally located axial bore (e.g., 351), a center housing side that comprises a plurality of center housing side orifices (e.g., 360, 360') positioned adjacent the center side opening of the axial bore, a compressor side that comprises a plurality of compressor side orifices (e.g., 357, 357') positioned adjacent a compressor side opening of the axial bore, a first port (e.g., 353) located on the center housing side of the plate, a second port (e.g., 352) located on the center housing side of the plate, a plurality of passages (e.g., defined by the plate) that link individually the first port to individual orifices of the plurality of center housing side orifices and a plurality of passages (e.g., defined by the plate) that link individually the second port to individual orifices of the plurality of compressor side orifices.

Such an exemplary thrust plate may be part of an assembly that includes a center housing where the center housing includes a lubricant inlet and a valve to control the resistance of a path from the lubricant inlet to the center housing side orifices and the resistance of a path from the lubricant inlet to the compressor side orifices. In such an assembly, the valve aims to control the resistances via pressure generated by axial movement of a turbocharger shaft positioned in a center bore of the center housing. As already mentioned, a thrust plate can cooperate with a thrust collar where the thrust collar (or one or more thrust washers) may be arranged coaxially with an axial bore of the thrust plate. As an assembly, such an arrangement can create a compressor side lubricant gap and a housing side lubricant gap. An axial dimension of such gaps (e.g., "z" of FIG. 5) typically changes with axial movement of a turbocharger shaft.

An exemplary turbocharger includes a center housing (e.g., 320) that includes a compressor side, a turbine side, a bore (e.g., 328) for supporting a turbocharger shaft, a valve (e.g., 370) and a lubricant feed port (e.g., 322); a turbocharger shaft (e.g., 330) positioned in the bore of the center housing wherein a portion of the shaft extends outward from the compressor side of the center housing; a thrust collar (e.g., 340) fitted to the portion of the turbocharger shaft extending outward from the compressor side of the center housing; a thrust plate (e.g., 350) positioned on the compressor side of the center housing that comprises compressor side lubricant orifices (e.g., 357, 357') for compressor side pads (e.g., 359) and housing side lubricant orifices (e.g., 360, 360') for housing side pads (e.g., 361) wherein the pads can receive axial thrust forces from the thrust collar due to axial movement of the turbocharger shaft and wherein the valve controls resistance of lubricant flow from the lubricant feed port to the compressor side lubricant orifices and resistance of lubricant flow from the lubricant feed port to the housing side lubricant orifices based at least in part on lubricant pressure generated by the axial movement of the turbocharger shaft.

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A center housing for a turbocharger, the center housing comprising:
   a bore for supporting a turbocharger shaft;
   a lubricant feed port;
   a first lubricant outlet port;
   a second lubricant outlet port;
   a valve operably disposed to provide a first path from the lubricant feed port to the first lubricant outlet port and a second path from the lubricant feed port to the second lubricant outlet port wherein the valve responds to pressure generated by axial movement of the turbocharger shaft to increase resistance of the first path or the second path; and
   a thrust plate that includes a first port to receive lubricant from the first lubricant outlet port of the housing and a second port to receive lubricant from the second lubricant outlet port of the housing.

2. The center housing of claim 1 wherein the valve comprises a spool.

3. The assembly of claim 1 wherein the first port of the thrust plate provides lubricant to a compressor side of the thrust plate and wherein the second port of the thrust plate provides lubricant to a housing side of the plate.

4. The assembly of claim 1 wherein the first port and the second port communicate pressure generated by axial movement of the turbocharger shaft to the first outlet port of the housing and the second outlet port of the housing, respectively.

5. A substantially disc-shaped thrust plate for a turbocharger, the plate comprising:
   a centrally located axial bore;
   a center housing side that comprises a plurality of center housing side orifices positioned adjacent the center side opening of the axial bore;
   a compressor side that comprises a plurality of compressor side orifices positioned adjacent a compressor side opening of the axial bore;
   a first port located on the center housing side of the plate;
   a second port located on the center housing side of the plate;
   a plurality of passages that link individually the first port to individual orifices of the plurality of center housing side orifices; and
   a plurality of passages that link individually the second port to individual orifices of the plurality of compressor side orifices.

6. An assembly comprising a center housing for a turbocharger and the thrust plate of claim 5.

7. The assembly of claim 6 wherein the center housing comprises a lubricant inlet and a valve to control the resistance of a path from the lubricant inlet to the center housing side orifices and the resistance of a path from the lubricant inlet to the compressor side orifices.

8. The assembly of claim 7 wherein the valve comprises a spool.

9. The assembly of claim 7 wherein the valve controls the resistances via pressure generated by axial movement of a turbocharger shaft positioned in a center bore of the center housing.

10. The assembly of claim 6 further comprising a thrust collar arranged coaxially with the centrally located axial bore of the thrust plate.

11. The assembly of claim 10 wherein the thrust collar and the thrust plate form a compressor side lubricant gap and a housing side lubricant gap.

12. The assembly of claim 11 further comprising a turbocharger shaft, the thrust collar fitted to the turbocharger shaft and responsive to axial movement of the shaft.

13. The assembly of claim 12 wherein axial movement of the turbocharger shaft changes an axial dimension of the compressor side lubricant gap and changes an axial dimension of the housing side lubricant gap.

14. A turbocharger comprising:
   a center housing that comprises a compressor side, a turbine side, a bore for supporting a turbocharger shaft, a valve and a lubricant feed port;
   a turbocharger shaft positioned in the bore of the center housing wherein a portion of the shaft extends outward from the compressor side of the center housing;
   a thrust collar fitted to the portion of the turbocharger shaft extending outward from the compressor side of the center housing;
   a thrust plate positioned on the compressor side of the center housing that comprises compressor side lubricant orifices for compressor side pads and housing side lubricant orifices for housing side pads wherein the pads can receive axial thrust forces from the thrust collar due to axial movement of the turbocharger shaft and wherein the valve controls resistance of lubricant flow from the lubricant feed port to the compressor side lubricant orifices and resistance of lubricant flow from the lubricant feed port to the housing side lubricant orifices based at least in part on lubricant pressure generated by the axial movement of the turbocharger shaft.

* * * * *